United States Patent
Doy

(10) Patent No.: US 11,815,059 B2
(45) Date of Patent: Nov. 14, 2023

(54) AUTOMATIC ENGINE SHUTDOWN AND STARTING FOR AN AUTONOMOUS MACHINE

(71) Applicant: Caterpillar Paving Products Inc., Brooklyn Park, MN (US)

(72) Inventor: Nathaniel Doy, Maple Grove, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 101 days.

(21) Appl. No.: 17/650,023

(22) Filed: Feb. 4, 2022

(65) Prior Publication Data

US 2023/0250786 A1 Aug. 10, 2023

(51) Int. Cl.
*F02N 11/08* (2006.01)
*B60W 60/00* (2020.01)

(52) U.S. Cl.
CPC ....... *F02N 11/0811* (2013.01); *B60W 60/001* (2020.02); *F02N 11/0862* (2013.01); *B60W 2510/244* (2013.01); *B60W 2530/00* (2013.01)

(58) Field of Classification Search
CPC ............ F02N 11/0811; F02N 11/0862; B60W 60/001; B60W 2510/244; B60W 2530/00

USPC ....... 123/179.3, 179.4, 198 D; 701/107, 110, 701/112, 113

See application file for complete search history.

(56) References Cited

U.S. PATENT DOCUMENTS

| | | | |
|---|---|---|---|
| 6,434,475 B2 | 8/2002 | Kaneko et al. | |
| 6,782,704 B2 | 8/2004 | Kuroda et al. | |
| 7,708,100 B2 | 5/2010 | Asakage et al. | |
| 7,983,812 B2 | 7/2011 | Potter | |
| 10,385,817 B2 | 8/2019 | Books et al. | |
| 2009/0312894 A1 | 12/2009 | Meltser et al. | |
| 2019/0071067 A1* | 3/2019 | Leone | F02N 11/0837 |

* cited by examiner

*Primary Examiner* — Hai H Huynh
(74) *Attorney, Agent, or Firm* — Harrity & Harrity, LLP

(57) ABSTRACT

In some implementations, a controller may determine whether a machine is operating in an autonomous mode or a manual mode. The controller may cause, based on a determination that the machine has been in an idle state for a first timer period, shutdown of an engine of the machine. The controller may monitor, based on a determination that the machine is operating in the autonomous mode, whether a condition for starting the engine is satisfied. The controller may cause, based on a determination that the engine has been shut down for a second timer period and that the condition is not satisfied, the machine to transition to a low power mode. The controller may cause, when the condition is satisfied, starting of the engine.

20 Claims, 3 Drawing Sheets

AUTOMATIC ENGINE SHUTDOWN AND STARTING FOR AN AUTONOMOUS MACHINE

TECHNICAL FIELD

The present disclosure relates generally to autonomous machines and, for example, to automatic engine shutdown and starting for an autonomous machine.

BACKGROUND

Machines, such as cold planers, haul trucks, asphalt pavers, compactor machines, excavators, wheel loaders, and other machines are frequently employed for paving, construction, mining, and other activities. For example, compactor machines are used for compacting soil, gravel, fresh laid asphalt, and other compactable materials associated with worksite surfaces.

In the context of a compactor machine, a task may be to compact the surface at a worksite, whereby the weight of the compactor machine and the vibration of compaction drums compress the surface materials to a solidified mass. In some examples, loose asphalt is deposited and spread over the worksite surface, and one or more compactor machines may travel over the loose asphalt to produce a densified, rigid asphalt mat. These and other tasks may be performed autonomously or semi-autonomously without continuous control by a human operator.

Autonomous operation presents advantages over traditional approaches to paving, construction, or mining activities, in that autonomous processes do not rely on operator judgement and/or perception when performing such tasks. Thus, these tasks can be performed by autonomous machines with reduced levels of operator training and/or experience. As a result, human error can be reduced in performing construction and mining tasks. Additionally, the autonomous machines may provide a more consistent performance and can work effectively for relatively long periods of time. As a result, autonomous machines, such as autonomous compactors, dozers, excavators, or the like, provide advantages in work quality, efficiency, and cost.

However, while autonomous operation may improve operator utilization (e.g., one operator or operator station may control many machines), machines may still experience significant downtime. For example, an autonomous machine may be idle for periods of time during sequential operations that are performed by one or more autonomous machines. Moreover, an engine of the autonomous machine may remain running during idle times. Thus, the idle times result in excessive fuel consumption, excessive wear to the machine, more frequent maintenance being needed for the machine, or the like.

U.S. Pat. No. 7,983,812 (the '812 patent) discloses a method for battery power management in an emergency vehicle having an engine off and warning lights on. The '812 patent indicates that the method may include monitoring a voltage level of a battery of the emergency vehicle, determining if the battery voltage level is below a predetermined threshold, and if it is determined that the battery voltage level is below the predetermined threshold, automatically starting the emergency vehicle's engine to charge the battery. The '812 patent also indicates that the method may include determining if the emergency vehicle's battery is charged, and if it is determined that the emergency vehicle's battery is charged, automatically turning off the emergency vehicle's engine.

The method disclosed by the '812 patent is not described in connection with an autonomous machine. An autonomous machine may be in communication with a remotely-located controller that provides commands to the autonomous machine. Thus, if the autonomous machine loses the ability to communicate with the remotely-located controller, which may occur when an engine of the autonomous machine is off, when a battery of the autonomous machine dies, or the like, then the autonomous machine may be unable to receive commands and perform autonomous operations. However, the '812 patent does not address maintaining communications between an autonomous machine and a remotely-located controller when automatically starting and shutting down an engine.

The control system of the present disclosure solves one or more of the problems set forth above and/or other problems in the art.

SUMMARY

In some implementations, a control system for a machine includes an engine of the machine; a battery of the machine; a plurality of systems of the machine that are configured to receive power from the battery; and a controller configured to: cause, based on a determination that the machine has been in an idle state for a first timer period, shutdown of the engine; monitor, based on shutdown of the engine, whether a condition for starting the engine is satisfied, the condition being at least one of: that a level of the battery is below a threshold, or that an autonomous operation for an autonomous mode of the machine is commanded; cause, based on a determination that the engine has been shut down for a second timer period and that the condition is not satisfied, the machine to transition to a low power mode in which one or more of the plurality of systems do not receive power from the battery; and cause, when the condition is satisfied, starting of the engine.

In some implementations, a method includes determining, by a controller of a machine, whether the machine is operating in an autonomous mode of the machine or a manual mode of the machine; causing, by the controller and based on a determination that the machine has been in an idle state for a first timer period, shutdown of an engine of the machine; monitoring, by the controller and based on a determination that the machine is operating in the autonomous mode, whether a condition for starting the engine is satisfied, the condition being at least one of: that a level of a battery of the machine is below a threshold, that an autonomous operation in the autonomous mode of the machine is commanded, or that a temperature of the engine is below a threshold; causing, by the controller based on a determination that the engine has been shut down for a second timer period and that the condition is not satisfied, the machine to transition to a low power mode; and causing, by the controller when the condition is satisfied, starting of the engine.

In some implementations, a machine operable in an autonomous mode includes an engine; a battery; a plurality of systems that are configured to receive power from the battery; and a controller configured to: cause, based on a determination that the machine is in an idle state, shutdown of the engine; monitor, based on shutdown of the engine, whether a condition for starting the engine is satisfied, the condition being at least one of: that a level of the battery is below a threshold, or that an autonomous operation for the autonomous mode of the machine is commanded; cause, when the condition is not satisfied, the machine to transition to a low power mode in which one or more of the plurality of systems do not receive power from the battery; and cause, when the condition is satisfied, starting of the engine.

DETAILED DESCRIPTION

This disclosure relates to a control system, which is applicable to any machine capable of operating in an autonomous mode.

Figure 1:
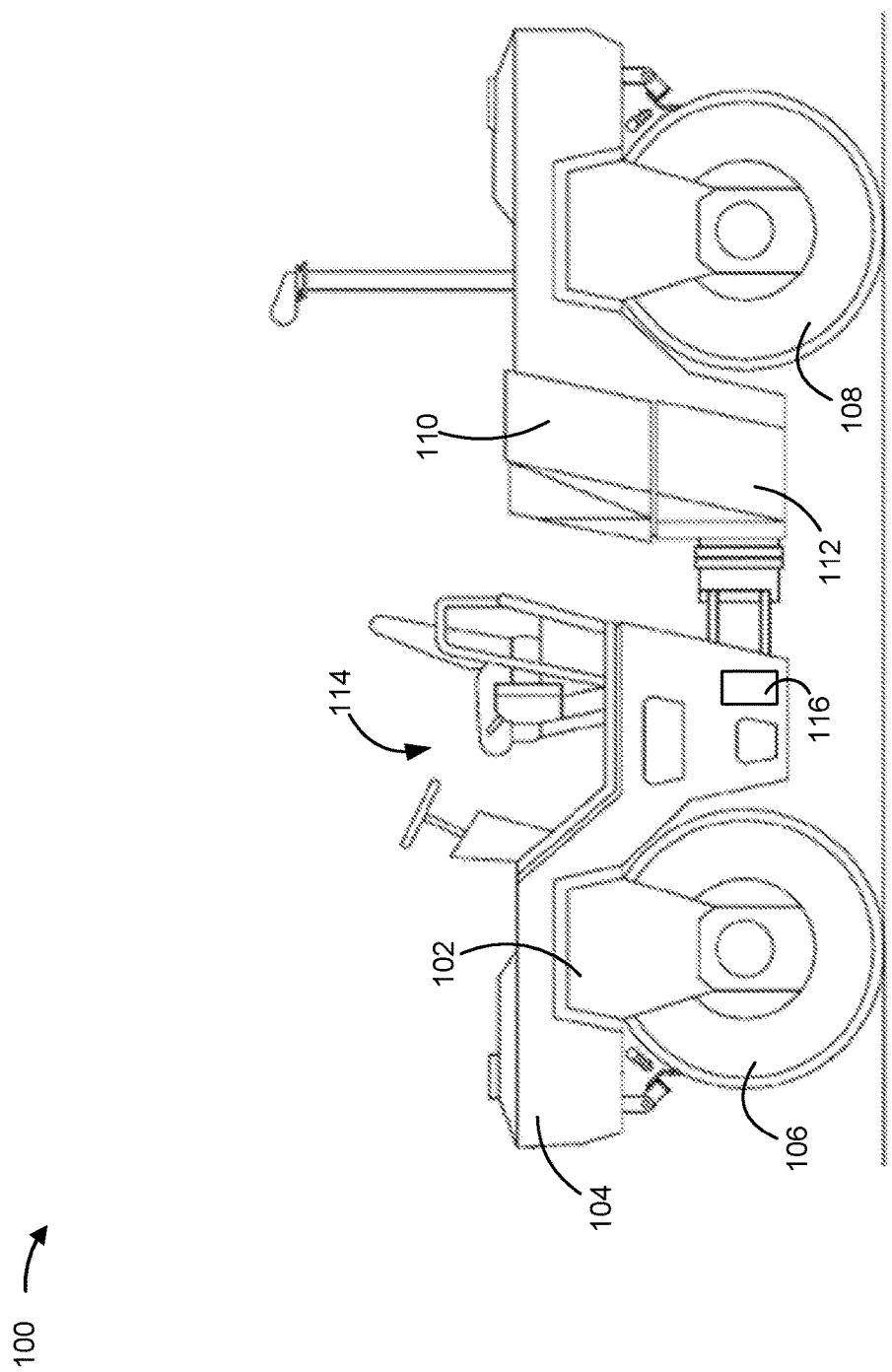
FIG. 1 is a diagram of an example machine described herein.

FIG. 1 shows an example machine 100. The machine 100 may be a compactor machine, as shown, or another machine such as a vehicle, a paving machine, a cold planer, a grading machine, a backhoe loader, a wheel loader, a harvester, an excavator, a motor grader, a skid steer loader, a tractor, a dozer, or the like. The machine 100 may be an autonomous machine. For example, the machine 100 may be selectively operable in an autonomous mode or a manual mode (e.g., a user-operated mode). In the autonomous mode, the machine 100 may receive, or otherwise obtain, a set of instructions or parameters for performing an operation, and the machine 100 may autonomously (e.g., by automatically controlling steering, propulsion, braking, implement movement, or the like) perform the operation based on the set of instructions or parameters. The machine 100 may receive the set of instructions or parameters from an operator and/or a controller on-board the machine 100 or remotely located from the machine 100. In the manual mode, an operator on-board the machine 100 or remotely located from the machine 100 may provide inputs (e.g., steering inputs, propulsion inputs, braking inputs, implement movement inputs, or the like) for performing an operation.

The machine 100 includes a frame 102 supporting a machine body 104 and one or more compaction drums, shown as a front compaction drum 106 and a rear compaction drum 108. The compaction drums 106, 108 provide ground engagement of the machine 100. In some examples, the machine 100 may include one or more other ground engagement members, such as one or more wheels and/or one or more tracks, in addition or alternatively to the front compaction drum 106 and/or the rear compaction drum 108. An engine 110, or other power source, is also supported on the frame 102 for powering compaction drums 106, 108, other ground-engaging elements, and/or an implement assembly.

The machine 100 includes a battery 112. The battery 112 may provide power to various systems of the machine 100 (described in connection with FIG. 2), such as a communication system, a battery-monitoring system, a display system, a lighting system, a steering system, a transmission system, or a starter system, among other examples. The machine 100 may include an operator control station 114 housing various actuators and controls (e.g., a steering control, a movement control, a braking control, or the like) for facilitating operator control of the machine 100 (e.g., in a manual mode). For example, an operator may manipulate one or more actuators to electronically control components such as the compaction drums 106, 108, other ground-engaging elements, and/or an implement assembly to perform work operations.

A controller 116 (e.g., an electronic control module (ECM)), supported on the machine 100, may receive signals from the actuators or controls, indicating desired control, and translate the signals into electronic commands for carrying out the desired control. In addition, the controller 116 may include autonomous controls for controlling autonomous operations of the machine 100. In connection with autonomous operation of the machine 100, the machine 100 may include one or more sensors in communication with the controller 116. Furthermore, the controller 116 may be configured to cause shutdown and starting of the engine 110. The controller 116 may include one or more memories and/or one or more processors configured to perform operations described herein.

As indicated above, FIG. 1 is provided as an example. Other examples may differ from what is described with regard to FIG. 1.

Figure 2:
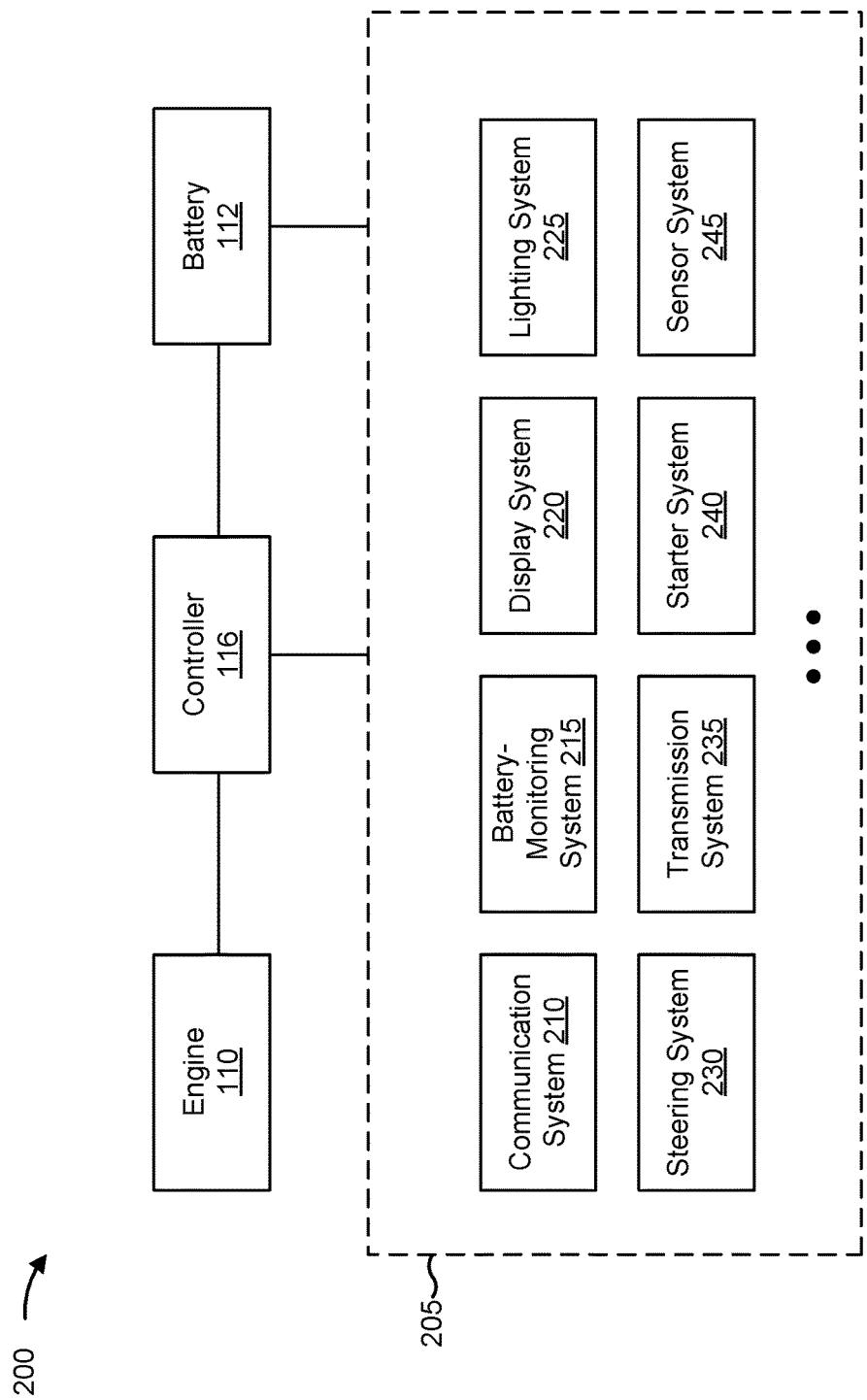
FIG. 2 is a diagram of an example control system described herein.

FIG. 2 shows an example control system 200. The control system 200 may be included in the machine 100. The control system 200 includes the engine 110, the battery 112, and/or the controller 116. In addition, the control system 200 may include a plurality of systems 205 configured to receive power from the battery 112. For example, the plurality of systems 205 may receive power from the battery 112 when the engine 110 is off, or in some cases, while the engine 110 is running. The plurality of systems 205 may include a communication system 210, a battery-monitoring system 215, a display system 220, a lighting system 225, a steering system 230, a transmission system 235, a starter system 240, and/or a sensor system 245, among other examples.

The communication system 210 may include a controller, a radio unit (e.g., a transceiver), and/or another device for facilitating communications of the machine 100. In particular, the communication system 210 may be configured to communicate with a remotely-located controller, for example, to receive commands for autonomous operations that are to be performed in an autonomous mode of the machine 100. The battery-monitoring system 215 may include a controller and/or a voltage detection component for monitoring a level (e.g., a charge level, a voltage, or the like) of the battery 112.

The display system 220 may include a controller, one or more sensors (e.g., an ambient light sensor, a touch sensor, or the like), and/or one or more displays (e.g., one or more analog displays, one or more digital displays, one or more video screens, one or more touchscreen displays, or the like) in the operator control station 114 or located elsewhere on the machine 100. The lighting system 225 may include a controller, one or more sensors (e.g., an ambient light sensor), and/or one or more lights of the machine 100, such as headlights, taillights, brake lights, parking lights, and/or lights of the operator control station 114, among other examples.

The steering system 230 may include a controller, one or more sensors (e.g., a position sensor), and/or one or more steering controls (e.g., a steering wheel), in the operator control station 114 or located elsewhere on the machine 100. The transmission system 235 may include a controller, one or more sensors (e.g., a position sensor), a gearbox, and/or other components for transferring power from the engine 110 to ground engagement members of the machine 100.

The starter system 240 may include a controller, one or more sensors, an input device for initiating engine starting (e.g., a push button, a switch, or the like), and/or an ignition device for starting the engine 110. The sensor system 245 may include one or more sensors, such as one or more of the sensors of the plurality of systems 205 of the machine, described above, and/or one or more other sensors (e.g., a machine-location sensor, a speed sensor, an acceleration sensor, a torque sensor, a work implement position sensor, and/or a pressure sensor, among other examples). The plurality of systems 205 may include additional systems, fewer systems, and/or different systems from the aforementioned systems.

The machine 100 may be employed at a work site, alone or with one or more additional machines (e.g., that are the same type of machine as the machine 100 and/or a different type of machine than the machine 100). The machine 100 may perform operations (e.g., operations associated with depositing paving material, operations associated with compacting paving material, or the like) at the work site in an autonomous mode (e.g., an unmanned mode) of the machine 100 and/or in a manual mode (e.g., a manned mode) of the machine 100. Between operations, the machine 100 may be idle, where the machine 100 is not performing operations. In this context, the controller 116 of the control system 200 may be configured to perform operations associated with automatic shutdown and starting of the engine 110, as described herein.

The controller 116 may perform one or more different operations associated with automatic shutdown and starting of the engine 110 based on whether the machine 100 is operating in the autonomous mode or the manual mode. Thus, the controller 116 may determine whether the machine 100 is operating in the autonomous mode or the manual mode. For example, the controller 116 may determine whether the machine 100 is operating in the autonomous mode or the manual mode based on an indicator, a flag, or the like, configured for the controller 116 that is indicative of whether the machine 100 is operating in the autonomous mode or the manual mode. As another example, the controller 116 may determine whether the machine 100 is operating in the autonomous mode or the manual mode based on receiving a command to perform an autonomous operation (e.g., indicating that the machine 100 is operating in the autonomous mode), based on information indicating a schedule of autonomous operations for the machine 100 (e.g., indicating that the machine 100 is operating in the autonomous mode), based on receiving inputs from actuators or controls of the operator control station 114 (e.g., indicating that the machine 100 is operating in the manual mode), or the like.

In a case when the machine 100 is determined to be operating in the manual mode, and while the engine 110 is running, the controller 116 may determine whether the machine 100 is in an idle state (e.g., whether the machine 100 is not currently performing any work operations). For example, in the manual mode, the controller 116 may determine that the machine 100 is in the idle state based on an absence of inputs from actuators or controls of the operator control station 114. Based on determining that the machine 100 is in the idle state, the controller 116 may initiate a first timer for a first timer period (e.g., five minutes, 10 minutes, 30 minutes, or the like). In some examples, the controller 116 may cause reduction to a speed of the engine 110 based on a determination that the machine 100 has been in the idle state for the first timer period (e.g., there was an absence of activity for a duration of the first timer period).

Based on reducing the speed of the engine 110, the controller 116 may initiate a second timer for a second timer period (e.g., five minutes, 10 minutes, 30 minutes, or the like). While the speed of the engine 110 is reduced, the controller 116 may monitor for activity indicating that the machine 100 is no longer in the idle state (e.g., inputs from actuators or controls of the operator control station 114 indicating that the machine 100 is no longer in the idle state). The controller 116 may cause shutdown of the engine 110 based on a determination that the speed of the engine 110 has been reduced for the second timer period (e.g., without detecting activity indicating that the machine 100 is no longer in the idle state). After shutdown of the engine 110, the engine 110 may be restarted manually by an operator of the machine 100, and the controller 116 may again monitor for idleness.

In a case when the machine 100 is determined to be operating in the autonomous mode, and while the engine 110 is running, the controller 116 may determine whether the machine 100 is in an idle state. For example, in the autonomous mode, the controller 116 may determine that the machine 100 is in the idle state based on determining that a previous autonomous operation in the autonomous mode of the machine 100 is complete and/or determining that a new autonomous operation (e.g., an autonomous operation that is to be performed at a current time) in the autonomous mode of the machine 100 has not been commanded (e.g., the controller 116 did not receive a command to perform the new autonomous operation). Based on determining that the machine 100 is in the idle state, the controller 116 may initiate a first timer for a first timer period (e.g., five minutes, 10 minutes, 30 minutes, or the like). The controller 116 may cause shutdown of the engine 110 based on a determination that the machine 100 has been in the idle state for the first timer period (e.g., there was an absence of activity for a duration of the first timer period). In some examples, the controller 116 may cause reduction to a speed of the engine 110 prior to causing shutdown of the engine 110, in a similar manner as described herein.

Based on shutdown of the engine 110 (e.g., in the case when the machine 100 is determined to be operating in the autonomous mode), the controller 116 may monitor for whether a condition for starting the engine 110 is satisfied. The condition may be that a level of the battery 112 is below a threshold. Additionally, or alternatively, the condition may be that an autonomous operation for the autonomous mode is commanded. A command for the autonomous operation may include a request to immediately start the autonomous operation or a notification that the autonomous operation is to be performed at a future time (e.g., a notification scheduling the autonomous operation for a future time or a notification indicating an estimate of a future time when the autonomous operation is to be performed). Additionally, or alternatively, the condition may be that a temperature of the engine 110 is below a threshold.

Based on shutdown of the engine 110, the controller 116 may initiate a second timer for a second timer period (e.g., five minutes, 10 minutes, 30 minutes, or the like). In some examples, based on monitoring whether the condition is satisfied, the controller 116 may determine that the condition is satisfied prior to expiration of the second timer period. Here, the controller 116 may cause starting of the engine 110 based on the condition being satisfied.

The controller 116 may cause the machine 100 to transition to a low power mode based on a determination that the engine 110 has been shut down for the second timer period and that the condition is not satisfied by expiration of the second timer period. In the low power mode, one or more of the plurality of systems 205 do not receive power from the battery 112 (e.g., thereby turning off the one or more systems). For example, the controller 116 may cause (e.g., via one or more power relays) opening of one or more circuits for power supply to the one or more systems to prevent the one or more systems from receiving power from the battery 112 in the low power mode. In the low power mode, the communication system 210 and/or the battery-monitoring system 215 continue to receive power from the battery 112 and at least one other system does not receive power from the battery 112. For example, in the low power mode, the display system 220, the lighting system 225, the steering system 230, the transmission system 235, the starter system 240, and/or the sensor system 245 does not receive power from the battery 112. In this way, the low power mode conserves fuel and reduces wear to the machine 100, but maintains communications between the machine 100 and a remotely-located controller that provides commands for autonomous operations of the machine 100.

Based on monitoring whether the condition is satisfied, the controller 116 may determine that the condition is satisfied. For example, the controller 116 may determine that the condition is satisfied while the machine 100 is in the low power mode. As another example, the controller 116 may determine that the condition is satisfied prior to expiration of the second timer period (e.g., and therefore the machine 100 does not enter the low power mode), as described above.

While monitoring whether the condition is satisfied, the controller 116 may detect that the level of the battery 112 is below the threshold, and the controller 116 may determine that the condition is satisfied based on detecting that the level of the battery 112 is below the threshold. While monitoring whether the condition is satisfied, the controller 116 may detect that the temperature of the engine 110 is below the threshold, and the controller 116 may determine that the condition is satisfied based on detecting that the temperature of the engine 110 is below the threshold.

While monitoring whether the condition is satisfied, the controller 116 may receive (e.g., from a remotely-located controller) a command to perform an autonomous operation (e.g., at a current time or at a future time) in the autonomous mode, and the controller 116 may determine that the condition is satisfied based on receiving the command. For example, the controller 116 may determine that the condition is satisfied based on receiving a command to immediately begin the autonomous operation. As another example, the controller 116 may determine that the condition is satisfied based on receiving a notification scheduling the autonomous operation for a future time or indicating an estimate of a future time when the autonomous operation is to be performed, and based on an amount of time needed by the machine 100 to ready (e.g., warm up) one or more mechanical systems (e.g., the engine 110), to obtain position information for the machine 100, or the like (e.g., if an autonomous operation is scheduled five minutes in the future, and readying the engine 110 takes five minutes, the controller 116 may determine that the condition is satisfied). The controller 116 may be configured with information that indicates an amount of time needed for an operation (e.g., an amount of time needed to ready the engine 110), may determine an amount of time needed for an operation based on historical data (e.g., historical data indicating one or more times previously needed by the machine 100 for the operation), may determine an amount of time needed for an operation using a machine learning model, or the like.

When the condition is satisfied (e.g., based on the controller 116 determining that the condition is satisfied), the controller 116 may cause starting of the engine 110. For example, as described herein, the condition may be satisfied, and therefore the controller 116 may cause starting of the engine 110, while the machine 100 is in the low power mode or without the machine 100 being in the low power mode (e.g., while the engine 110 is shut down but prior to expiration of the second timer period). After starting of the engine 110, the controller 116 may again monitor for idleness.

As indicated above, FIG. 2 is provided as an example. Other examples may differ from what is described with regard to FIG. 2.

Figure 3:
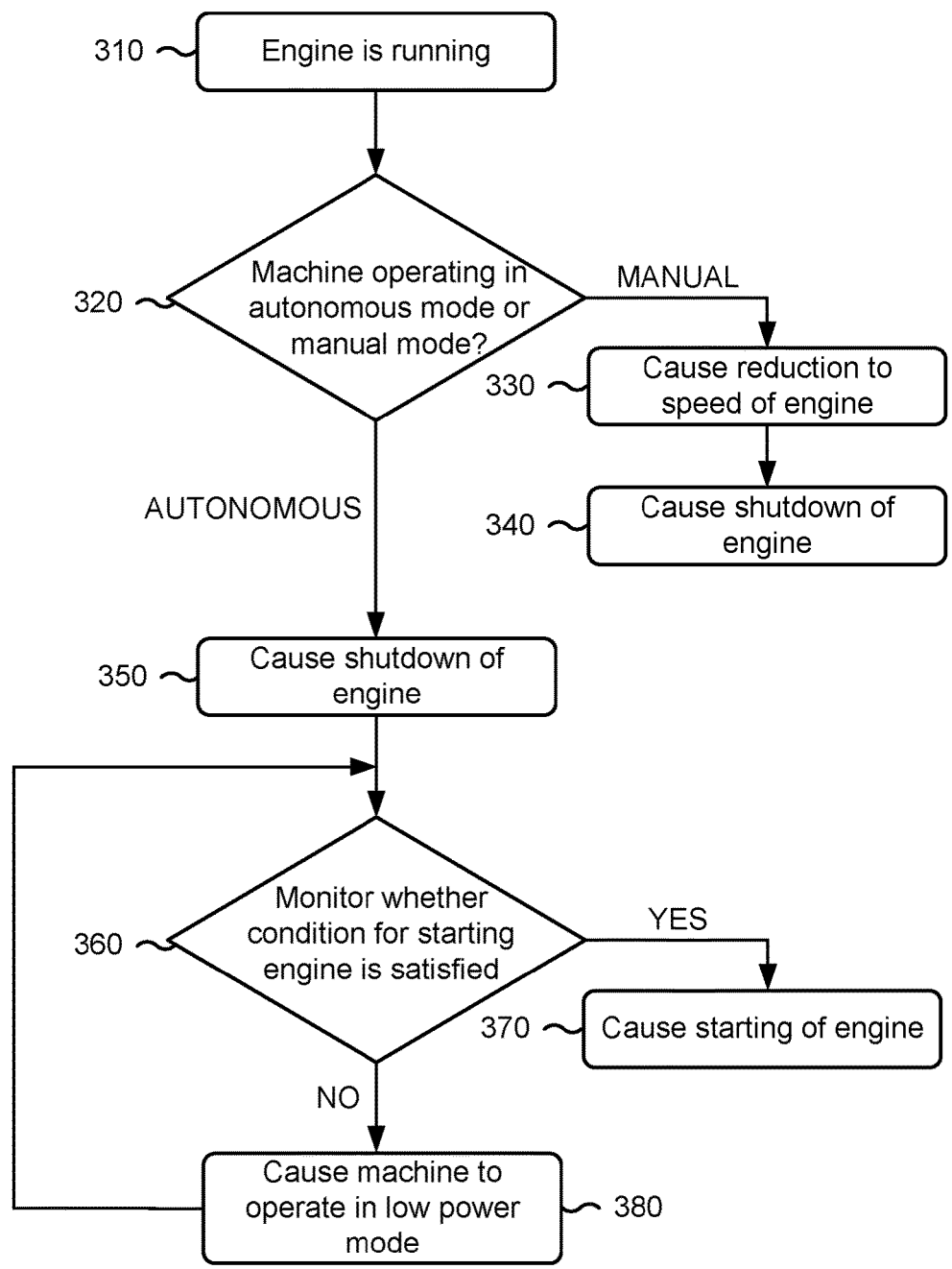
FIG. 3 is a flowchart of an example process relating to automatic engine shutdown and starting.

FIG. 3 is a flowchart of an example process 300 associated with automatic engine shutdown and starting. One or more process blocks of FIG. 3 may be performed by a controller (e.g., controller 116). Additionally, or alternatively, one or more process blocks of FIG. 3 may be performed by another device or a group of devices separate from or including the controller, such as another device or component that is internal or external to the machine 100.

Process 300 begins when an engine of a machine is running (block 310). The machine may be a compactor machine. As shown in FIG. 3, process 300 may include determining whether the machine is operating in an autonomous mode of the machine or a manual mode of the machine (block 320). For example, the controller (e.g., using a processor, a memory, a communication component, an input component, or the like) may determine whether the machine is operating in an autonomous mode of the machine or a manual mode of the machine, as described above.

If the machine is operating in the manual mode (block 320—MANUAL), process 300 may include causing, based on a determination that the machine has been in an idle state for a timer period, reduction to a speed of the engine (block 330). For example, the controller (e.g., using a processor, a memory, or the like) may cause reduction to a speed of the engine. As further shown in FIG. 3, process 300 may include causing, based on a determination that the speed of the engine has been reduced for a timer period, shutdown of the engine (block 340). For example, the controller (e.g., using a processor, a memory, or the like) may cause shutdown of the engine.

If the machine is operating in the autonomous mode (block 320—AUTONOMOUS), process 300 may include causing, based on a determination that the machine has been in an idle state for a timer period, shutdown of the engine (block 350). For example, the controller (e.g., using a processor, a memory, or the like) may cause, based on a determination that the machine has been in an idle state for a timer period, shutdown of the engine, as described above. In some examples, process 300 may include causing reduction to a speed of the engine prior to causing shutdown of the engine, as described above.

Determining that the machine has been in the idle state for the timer period may include determining that the machine is in the idle state, and initiating a timer for the timer period based on determining that the machine is in the idle state. Determining that the machine is in the idle state may include determining that a previous autonomous operation in the autonomous mode of the machine is complete, and determining that a new autonomous operation in the autonomous mode of the machine has not been commanded.

As further shown in FIG. 3, process 300 may include monitoring whether a condition for starting the engine is satisfied (block 360). For example, the controller (e.g., using a processor, a memory, an input component, a communication component, or the like) may monitor whether a condition for starting the engine is satisfied. The condition may be at least one of: that a level of a battery of the machine is below a threshold, that an autonomous operation in the autonomous mode of the machine is commanded, or that a temperature of the engine is below a threshold, as described above.

Monitoring whether the condition is satisfied may include detecting that the level of the battery is below the threshold, and determining that the condition is satisfied based on detecting that the level of the battery is below the threshold. Additionally, or alternatively, monitoring whether the condition is satisfied may include receiving a command to perform the autonomous operation in the autonomous mode, and determining that the condition is satisfied based on receiving the command.

If the condition is satisfied prior to expiration of a timer period (block 360—YES), then process 300 may include causing starting of the engine (block 370). For example, the controller (e.g., using a processor, a memory, or the like) may cause starting of the engine. Otherwise (block 360—NO), process 300 may include causing, based on a determination that the engine has been shut down for the timer period, the machine to operate in (e.g., transition to) a low power mode (block 380). For example, the controller (e.g., using a processor, a memory, or the like) may cause the machine to transition to a low power mode, as described above.

In the low power mode, one or more systems of the machine that are configured to receive power from the battery do not receive power from the battery. For example, a plurality of systems that are configured to receive power from the battery may include a communication system, a battery-monitoring system, and at least one additional system, and in the low power mode, the at least one additional system does not receive power from the battery. As an example, the at least one additional system that does not receive power from the battery in the low power mode may include a display system, a lighting system, a steering system, a transmission system, a starter system, or a sensor system.

As further shown in FIG. 3, while the machine is in the low power mode, if the condition is satisfied (block 360—YES), then process 300 may proceed to block 370. If the condition is not satisfied while the machine is in the low power mode (block 360—NO), then process 300 may include maintaining the machine in the low power mode. Thus, the condition may be satisfied prior to expiration of the timer period for transitioning to the low power mode or while the machine is in the low power mode. In other words, starting of the engine may be caused, when the condition is satisfied, while the machine is in the low power mode or without the machine being in the low power mode.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

The control system described herein may be used with any machine having an engine. In particular, the control system may be used with an autonomous machine that can operate in an autonomous mode. For example, the autonomous machine may be capable of selectively operating an in autonomous mode or in a manual mode. When the machine is employed at a work site (e.g., for performing one or more autonomous operations in sequence), the control system may be used to automatically control shutdown and starting of the engine of the machine. For example, the control system may cause shutdown of the engine when the machine is in an idle state. In this way, excessive fuel consumption and/or excessive wear to the machine may be avoided.

Moreover, while the engine is shut down, the control system may cause the machine to transition to a low power mode. In the low power mode, systems of the machine that are dispensable do not receive power from a battery of the machine (e.g., the systems are turned off). In this way, the low power mode conserves the battery. However, in the low power mode, a communication system of the machine, used for receiving commands (e.g., instructions and/or parameters) for performing autonomous operations continues to receive power from the battery (e.g., the communication system remains online). Accordingly, while the engine is shut down, the machine may receive (e.g., from a remotely-located controller) a command to perform an autonomous operation. In this way, the engine can be shut down to reduce fuel consumption and wear without inhibiting the availability and utility of the machine for autonomous operation.

Furthermore, the control system may monitor a level of the battery, and the control system may cause the engine to start if the level of the battery is too low. Starting the engine may recharge the battery and/or generate power for powering systems of the machine. In this way, the control system prevents complete shutdown of the machine due to the battery dying, where the machine may be unable to receive a command to perform an autonomous operation. Thus, the control system strikes a balance between reducing fuel consumption/wear and maintaining the machine's ability to communicate with a remotely-located controller to receive commands for autonomous operations. In addition, the control system may monitor a temperature of the engine (e.g., a diesel engine), and the control system may cause the engine to start if the temperature of the engine is too low (e.g., which may occur in very cold environments, such as below zero degrees Fahrenheit, and when the engine is shut down for a significant time period). In this way, upon receiving a command for an autonomous operation, the machine is ready to begin the autonomous operation and delay for machine warm up may be reduced or eliminated, thereby improving an uptime of the machine.

What is claimed is:

1. A control system for a machine, comprising:
an engine of the machine;
a battery of the machine;
a plurality of systems of the machine that are configured to receive power from the battery; and
a controller configured to:
cause, based on a determination that the machine has been in an idle state for a first timer period, shutdown of the engine;
monitor, based on shutdown of the engine, whether a condition for starting the engine is satisfied, the condition being at least one of:
that a level of the battery is below a threshold, or
that an autonomous operation for an autonomous mode of the machine is commanded;
cause, based on a determination that the engine has been shut down for a second timer period and that the condition is not satisfied, the machine to transition to a low power mode in which one or more of the plurality of systems do not receive power from the battery; and
cause, when the condition is satisfied, starting of the engine.

2. The control system of claim 1, wherein the plurality of systems include a communication system, a battery-monitoring system, and at least one additional system, and
    wherein the one or more of the plurality of systems include the at least one additional system.

3. The control system of claim 1, wherein the controller is further configured to:
    determine whether the machine is operating in the autonomous mode or a manual mode of the machine,
        wherein the controller is configured to monitor whether the condition is satisfied based on a determination that the machine is operating in the autonomous mode.

4. The control system of claim 1, wherein the controller is further configured to:
    determine that the machine is in the idle state based on:
        a determination that a previous autonomous operation in the autonomous mode of the machine is complete; and
        a determination that a new autonomous operation in the autonomous mode of the machine has not been commanded.

5. The control system of claim 1, wherein the controller, to monitor whether the condition is satisfied, is configured to:
    detect that the level of the battery is below the threshold; and
    determine that the condition is satisfied based on detecting that the level of the battery is below the threshold.

6. The control system of claim 1, wherein the controller, to monitor whether the condition is satisfied, is configured to:
    receive a command to perform the autonomous operation in the autonomous mode; and
    determine that the condition is satisfied based on receiving the command.

7. The control system of claim 1, wherein the one or more of the plurality of systems include at least one of:
    a display system,
    a lighting system,
    a steering system,
    a transmission system,
    a starter system, or
    a sensor system.

8. A method, comprising:
    determining, by a controller of a machine, whether the machine is operating in an autonomous mode of the machine or a manual mode of the machine;
    causing, by the controller and based on a determination that the machine has been in an idle state for a first timer period, shutdown of an engine of the machine;
    monitoring, by the controller and based on a determination that the machine is operating in the autonomous mode, whether a condition for starting the engine is satisfied, the condition being at least one of:
        that a level of a battery of the machine is below a threshold,
        that an autonomous operation in the autonomous mode of the machine is commanded, or
        that a temperature of the engine is below a threshold;
    causing, by the controller based on a determination that the engine has been shut down for a second timer period and that the condition is not satisfied, the machine to transition to a low power mode; and
    causing, by the controller when the condition is satisfied, starting of the engine.

9. The method of claim 8, further comprising:
    determining that the machine is in the idle state; and
    initiating a timer for the first timer period based on determining that the machine is in the idle state.

10. The method of claim 9, wherein determining that the machine is in the idle state comprises:
    determining that a previous autonomous operation in the autonomous mode of the machine is complete; and
    determining that a new autonomous operation in the autonomous mode of the machine has not been commanded.

11. The method of claim 8, further comprising:
    causing reduction to a speed of the engine prior to causing shutdown of the engine.

12. The method of claim 8, further comprising:
    causing, based on a determination that the machine is operating in the manual mode and that the machine has been in the idle state for the first timer period, reduction to a speed of the engine; and
    causing, based on a determination that the speed of the engine has been reduced for a third timer period, shutdown of the engine.

13. The method of claim 8, wherein, in the low power mode, one or more systems of the machine that are configured to receive power from the battery do not receive power from the battery.

14. The method of claim 8, wherein monitoring whether the condition is satisfied comprises:
    detecting that the level of the battery is below the threshold; and
    determining that the condition is satisfied based on detecting that the level of the battery is below the threshold.

15. The method of claim 8, wherein monitoring whether the condition is satisfied comprises:
    receiving a command to perform the autonomous operation in the autonomous mode; and
    determining that the condition is satisfied based on receiving the command.

16. The method of claim 8, wherein the condition is satisfied prior to expiration of the second timer period or while the machine is in the low power mode.

17. A machine operable in an autonomous mode, comprising:
    an engine;
    a battery;
    a plurality of systems that are configured to receive power from the battery; and
    a controller configured to:
        cause, based on a determination that the machine is in an idle state, shutdown of the engine;
        monitor, based on shutdown of the engine, whether a condition for starting the engine is satisfied, the condition being at least one of:
            that a level of the battery is below a threshold, or
            that an autonomous operation for the autonomous mode of the machine is commanded;
        cause, when the condition is not satisfied, the machine to transition to a low power mode in which one or more of the plurality of systems do not receive power from the battery; and
        cause, when the condition is satisfied, starting of the engine.

18. The machine of claim 17, wherein the controller, to cause starting of the engine, is configured to cause starting of the engine when the condition is satisfied while the machine is in the low power mode or without the machine being in the low power mode.

19. The machine of claim 17, wherein the controller, to cause shutdown of the engine, is configured to cause shutdown of the engine based on the determination that the machine has been in the idle state for a first timer period, and wherein the controller, to cause the machine to transition to the low power mode, is configured to cause the machine to transition to the low power mode based on a determination that the engine has been shut down for a second timer period.

20. The machine of claim 17, wherein, in the autonomous mode, the machine is configured to obtain a set of instructions for performing an operation and to autonomously perform the operation based on the set of instructions.

\* \* \* \* \*